Figure 1:
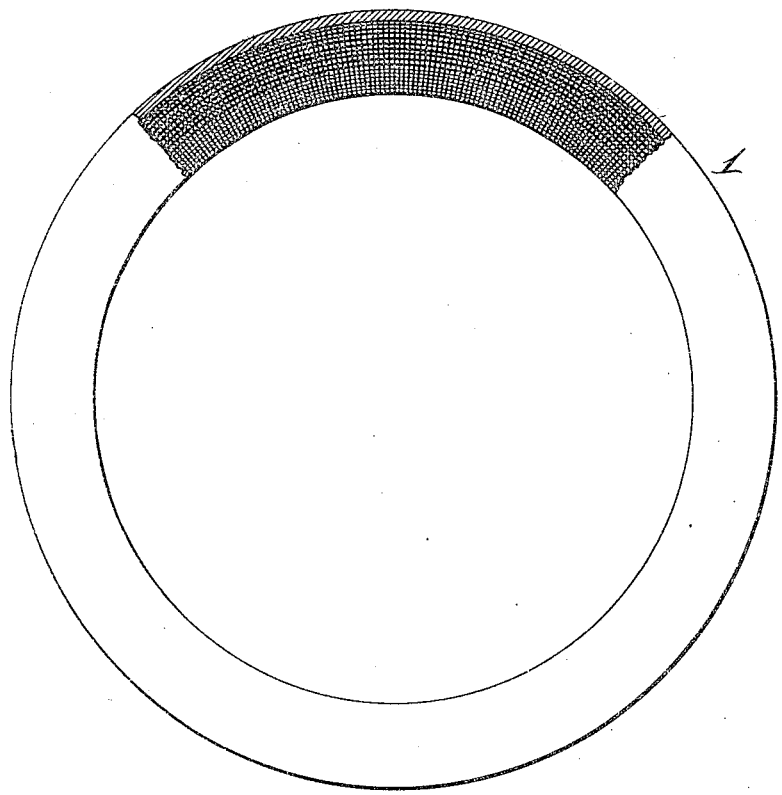

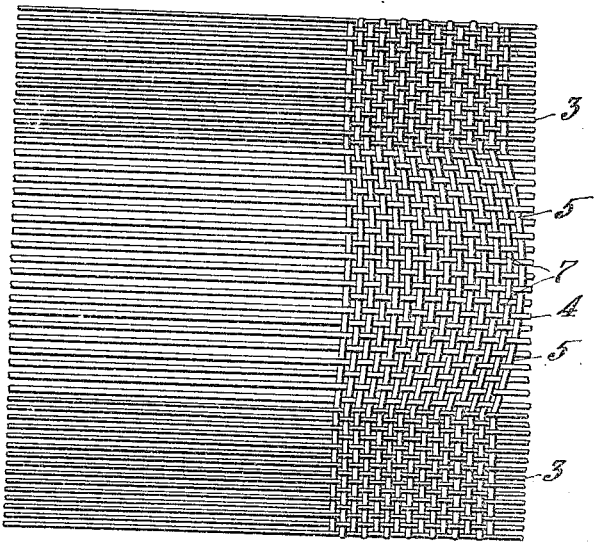
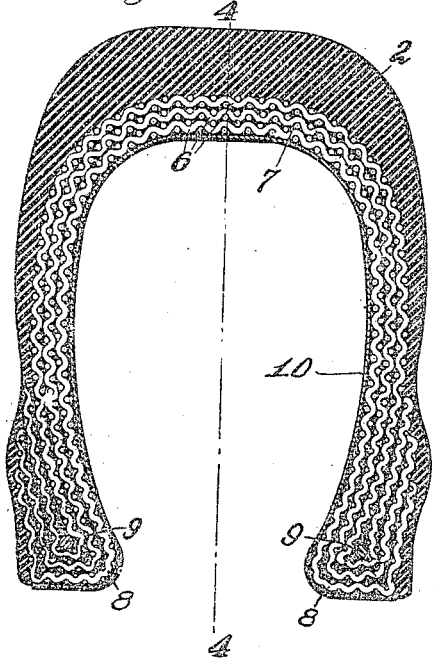
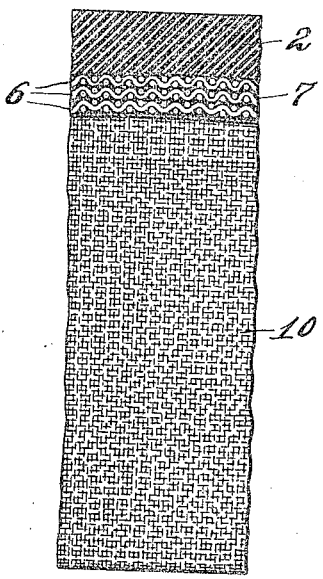

UNITED STATES PATENT OFFICE.

HENRY J. DOUGHTY, OF EDGEWOOD, RHODE ISLAND.

VEHICLE-TIRE.

1,077,128.

Specification of Letters Patent.     Patented Oct. 28, 1913.

Application filed September 25, 1913.  Serial No. 791,785.

*To all whom it may concern:*

Be it known that I, HENRY J. DOUGHTY, a citizen of the United States, and a resident of Edgewood, in the county of Providence and State of Rhode Island, have invented an Improvement in Vehicle-Tires, of which the following description, in connection with the accompanying drawings, is a specification, like characters on the drawings representing like parts.

This invention relates to vehicle tires, particularly adapted for use on automobiles.

In order that the principle of the invention may be readily understood, I have disclosed a single embodiment thereof in the accompanying drawings, wherein—

Figure 1 is a side elevation of the completed tire partly broken away to show the internal structure; Fig. 2 is a plan view of a portion of the fabric preferably employed in the formation of the tire; Fig. 3 is a transverse section taken through the tire; and Fig. 4 is a section at right angles to Fig. 3 upon the line 4—4 of the latter.

In the formation of the tire I employ an inner, laminated fabric portion and an outer tread portion of rubber or rubber-like material. The inner, laminated portion, which is preferably composed of a single piece wound continuously in spiral form so as to present overlapping layers, is composed of interlaced series of threads which may be woven or braided, but which are herein represented as woven with the warp threads extending circularly around the circumference of the tire, and the weft threads extending at substantially right angles thereto transversely of the tire.

Referring more particularly to the drawings, the completed tire is indicated at 1. It is provided with an outer rubber or rubber-like tread portion 2 and an inner laminated fabric portion which is composed of series of threads, which are initially interlaced in such manner as to conform to the shape of the tire. In the disclosed embodiment of the invention, I have represented the said laminated portion as composed of warp threads 3, 3, 4 and weft threads 5. It is of extreme importance that the tire be flexible in use and that it be held against elongation and enlargement circumferentially and transversely of the tire.

The fabric is, in the preferred embodiment of the invention, made in a continuous length so as to be wound layer upon layer, as indicated in Fig. 3, wherein I have represented three layers 6. A greater number of layers may be employed. The cloth strip is initially fabricated to conform to the ultimate shape of the tire, and while this result may be secured in any suitable manner, I preferably effect the same by weaving the fabric strip with a take-up roll of largest diameter at the middle portion and tapering toward its ends, so that the middle or tread warps 4 are fed faster than the side or bead warps 3, and consequently are longer in the completed fabric.

The term "bead" is herein used generically to mean side portions and to include the portions of the fabric which are positioned at or adjacent the beads of the tire.

The warp threads, extending circumferentially of the tire, are substantially non-extensible, so that the tire cannot be elongated or enlarged in the direction of its length, and the weft threads are likewise substantially non-extensible, thus preventing transverse enlargement of the tire. I therefore overcome the objections inherent in a knitted tire fabric, or one wherein the thread or threads do not assume straight or substantially straight positions in the tire.

The warp threads 4 are of greater diameter and are more widely spaced apart than the side or bead warps 3; and the weft threads 5, which are preferably of uniform diameter, are spaced more widely apart in the tread portion than at the side or bead portions of the fabric, as diagrammatically indicated in Fig. 2, gradually approaching toward the edge portions.

Preferably both the warp threads and the weft threads are respectively positioned nearer together from the tread toward the edges, thus providing meshes 7 of decreasing diameter, as diagrammatically indicated in Figs. 2 and 3. I thus provide a fabric which presents a looser weave at the tread than at the side portions, the said looser weave, in the disclosed embodiment of my invention, extending in both directions of the tread. Moreover the sides of the fabric are thinner than the tread, so as to permit the marginal portions of the fabric to be folded readily upon themselves to reinforce the sides of the fabric.

The spirally wound layers 6, owing to the employment of longer warp threads in the tread portion than in the sides, naturally and inherently take a concave or curved form in cross section, approximating that represented in Fig. 3. The woven strip is thus initially fabricated so as to conform to the shape, not only of the completed tire, but of the mold or form whereon the strip is wound in the formation of the tire. I thus prevent straining or displacement of the threads after the initial laying thereof and also prevent displacement or straining of the rubber coating which is applied to each of the layers of the fabric prior to the winding thereof upon the form.

The edge portions of the fabric are folded or bent, as represented at 8 in Fig. 3, about wire rings, hoops or any other suitable stiffening or strengthening members 9. The bent back or folded edges, and which are thinner than the tread, reinforce the sides. If desired, the extreme edge portions of the fabric may be provided with warp threads of gradually increasing length, in which case the shortest warp threads are those adjacent the wires 9. I may effect this result by providing the take-up roll of the loom with ends flaring from the portions which are of smallest diameter. Thus, the woven fabric will inherently take substantially the exact form of the tire casing in all directions, and if desired I may employ a thin inner fabric or other suitable layer 10.

The continuous woven strip, prior to the winding thereof upon the frame, is frictioned or calendered, being treated with an application of rubber preferably applied thereto in a heated condition, so that the rubber impregnates and permeates the meshes of the fabric and provides radial, rivet-like portions of varying diameter, whereby the outer tread portion 2 of the tire is anchored to and through the inner laminated portion thereof. Inasmuch as the woven strip is initially fabricated to the ultimate form of the tire, and inasmuch as the rubber coating is applied in the frictioning or calendering operation to the fabric while in its thus shaped condition, there is no displacement or straining of either the threads of the fabric or of the rubber coating and no separation of the one from the other. Inasmuch as the warp and weft threads are respectively straight, there is no change in use in the size or shape of the meshes, and hence I avoid all possibility of the shearing off of the rivet-like rubber portions that fill the meshes.

The rubber or like covering 2 is applied to the laminated fabric under heat and pressure and is combined in the vulcanizing operation with the rubber coating applied to the layers as they are wound in the manner described. The outer tread portion is thereby anchored to and through the inner laminated portion by rivet-like rubber portions which are of varying diameter from the tread portion toward the edges. By reason of the fact that the meshes at the tread portion are of greater diameter than those of the sides, a greater quantity of rubber penetrates or impregnates the tread portion of the tire in the frictioning or calendering operation per unit area than at the sides. The tire constructed as herein described is subjected to a suitable vulcanizing operation, and in use is provided with an inner air receiving tube.

By the described construction I produce a tire of great strength and long life, possessing the maximum wearing qualities, it being practically impossible for the rubber to be torn or removed from the tread of the tire.

It will be apparent from the foregoing that the completed tire is resilient, but that it is restrained from elongation or enlargement both longitudinally and transversely by reason of the interlaced threads and that the meshes formed by the latter are prevented from enlargement or displacement, thereby precluding the possibility of shearing off the rivet-like, radially extending, rubber portions.

Having thus described one illustrative embodiment of my invention, I desire it to be understood that although specific terms are employed, they are used in a generic and descriptive sense and not for purposes of limitation, the scope of the invention being set forth in the following claim.

Claim.

A vehicle tire composed of an inner laminated fabric portion initially shaped and rubber-impregnated in tire form, and an outer rubber tread portion, said inner laminated portion being composed of a series of circumferentially extending threads of greatest length substantially midway between the edges and a series of transversely extending threads, to retain the tire against circumferential and transverse elongation and enlargement, said two series of threads being interlaced throughout substantially the extent of said fabric portion, and presenting throughout the tread and side portions thereof rubber filled meshes of largest area at the tread and of smaller area at the marginal portions of the sides whereby the outer tread portion is anchored radially to and through the inner laminated portion by rivet-like rubber portions of graded area and the threads and rubber portions are confined from relative displacement.

In testimony whereof, I have signed my name to this specification, in the presence of two subscribing witnesses.

HENRY J. DOUGHTY.

Witnesses:
JOHN R. MOULTON,
MAY H. LOWRY.